(12) United States Patent
Yang et al.

(10) Patent No.: US 11,402,929 B2
(45) Date of Patent: Aug. 2, 2022

(54) ELECTRONIC PEN MAINBOARD AND ELECTRONIC PEN

(71) Applicant: BOE Technology Group Co., Ltd., Beijing (CN)

(72) Inventors: Jun Yang, Beijing (CN); Tao Li, Beijing (CN); Enhui Guan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/209,611

(22) Filed: Mar. 23, 2021

(65) Prior Publication Data
US 2021/0303088 A1  Sep. 30, 2021

(30) Foreign Application Priority Data
Mar. 24, 2020 (CN) .......................... 202020388662.1

(51) Int. Cl.
*G06F 3/0354* (2013.01)
(52) U.S. Cl.
CPC ................................ *G06F 3/03545* (2013.01)
(58) Field of Classification Search
CPC .................................................. G06F 3/03545
USPC ...................................................... 345/179
See application file for complete search history.

(56) References Cited

U.S. PATENT DOCUMENTS

| | | | | |
|---|---|---|---|---|
| 6,281,854 B1* | 8/2001 | Ohoka | ................... | H01Q 1/273 343/718 |
| 2008/0111747 A1* | 5/2008 | Ying | ........................ | H01Q 5/00 343/702 |
| 2011/0309985 A1* | 12/2011 | He | .......................... | H01Q 9/42 343/700 MS |
| 2012/0071214 A1* | 3/2012 | Ash, Jr. | ................... | H01Q 1/244 455/571 |
| 2017/0141473 A1* | 5/2017 | Sharawi | .................... | H01Q 1/48 |
| 2018/0076527 A1* | 3/2018 | Chen | ........................ | H01Q 9/42 |
| 2020/0033964 A1* | 1/2020 | Aoki | ....................... | G06F 3/046 |

OTHER PUBLICATIONS

Cheung et al. (CY Cheung, JS M. Yuen, SW Y. Mung, "Miniaturized Printed Inverted-F Antenna for Internet of Things: A Design on PCB with a Meandering Line and Shorting Strip", Int. J. Antennas Prop, pp. 13-18, 2018, retrieved from web on Sep. 11, 2021 from https://downloads.hindawi.com/journals (Year: 2018).*

* cited by examiner

*Primary Examiner* — Mark Edwards
(74) *Attorney, Agent, or Firm* — ArentFox Schiff LLP; Michael Fainberg

(57) ABSTRACT

The disclosure provides an electronic pen mainboard and an electronic pen. The electronic pen mainboard includes a mainboard ground, a ground line, a radio frequency signal feeder line, an antenna and a radio frequency chip. The antenna includes a radiating part distributed in an S shape; a ground part connected with the radiating part and connected with the mainboard ground through the ground line; and a transceiving part connected with the radiating part and connected with the radio frequency chip through the radio frequency signal feeder line. On a plane where the mainboard ground is located, the ground line is perpendicular to the radio frequency signal feeder line. The radio frequency chip is responsible for radio communication to realize remote wireless connection and control of each function; and the antenna is responsible for transmitting and receiving a radio signal.

14 Claims, 2 Drawing Sheets

ELECTRONIC PEN MAINBOARD AND ELECTRONIC PEN

CROSS-REFERENCE TO RELATED APPLICATION

This application is based on and claims priority under 35 U.S.C 119 to Chinese Patent Application No. 202020388662.1, filed on Mar. 24, 2020, in the China National Intellectual Property Administration. The entire disclosure of the above application is incorporated herein by reference.

FIELD

The disclosure relates to the technical field of antennae, and in particular to an electronic pen mainboard and an electronic pen.

BACKGROUND

A Printed Circuit Board Antenna, (PCB antenna) technology has been widely applied in modern society and may be applied to various fields such as commodity recognition and production tracking; and an electronic pen is a product produced by using the PCB antenna technology.

SUMMARY

The disclosure provides the following technical solutions.

Provided is an electronic pen mainboard, including a mainboard ground, a ground line, a radio frequency signal feeder line, an antenna and a radio frequency chip. The antenna includes: a radiating part distributed in an S shape; a ground part connected with the radiating part and connected with the mainboard ground through the ground line; and a transceiving part connected with the radiating part and connected with the radio frequency chip through the radio frequency signal feeder line. The ground line is perpendicular to the radio frequency signal feeder line on a plane where the mainboard ground is located.

In some embodiments, the antenna has a line width ranging from 1 mm to 2 mm.

In some embodiments, the radiating part includes a plurality of tracing areas disposed side by side and transition areas located between any two of adjacent tracing areas, and an extension direction of the radiating part in each of the tracing areas is perpendicular to an extension direction of the radiating part in the transition areas so that the radiating part is distributed in the S shape.

In some embodiments, the tracing areas have line lengths ranging from 3 mm to 5 mm, and the transition areas have line lengths ranging from 0.8 mm to 1.2 mm.

In some embodiments, a surface configured to trance, of the electronic pen mainboard includes a clearance region and a tracing region; the antenna is printed in the clearance region; and the radio frequency chip and the mainboard ground are printed in the tracing region.

In some embodiments, a gap is formed between an edge of the clearance region and the mainboard ground.

The disclosure further provides an electronic pen, including any one above-mentioned electronic pen mainboard.

In some embodiments, the electronic pen further includes a functional sensor and a battery; and the functional sensor and the battery are both electrically connected with the electronic pen mainboard.

In some embodiments, the radio frequency signal feeder line of the antenna is provided with a 0-ohm resistor and an external antenna interface.

DETAILED DESCRIPTION OF THE EMBODIMENTS

The technical solutions in embodiments of the disclosure will be clearly and completely described below in conjunction with the accompanying drawings in embodiments of the disclosure. Obviously, described embodiments are only a part of embodiments of the disclosure, not all embodiments. Based on embodiments in the disclosure, all other embodiments obtained by those of ordinary skill in the art without creative work shall fall within the protective scope of the disclosure.

Figure 1:
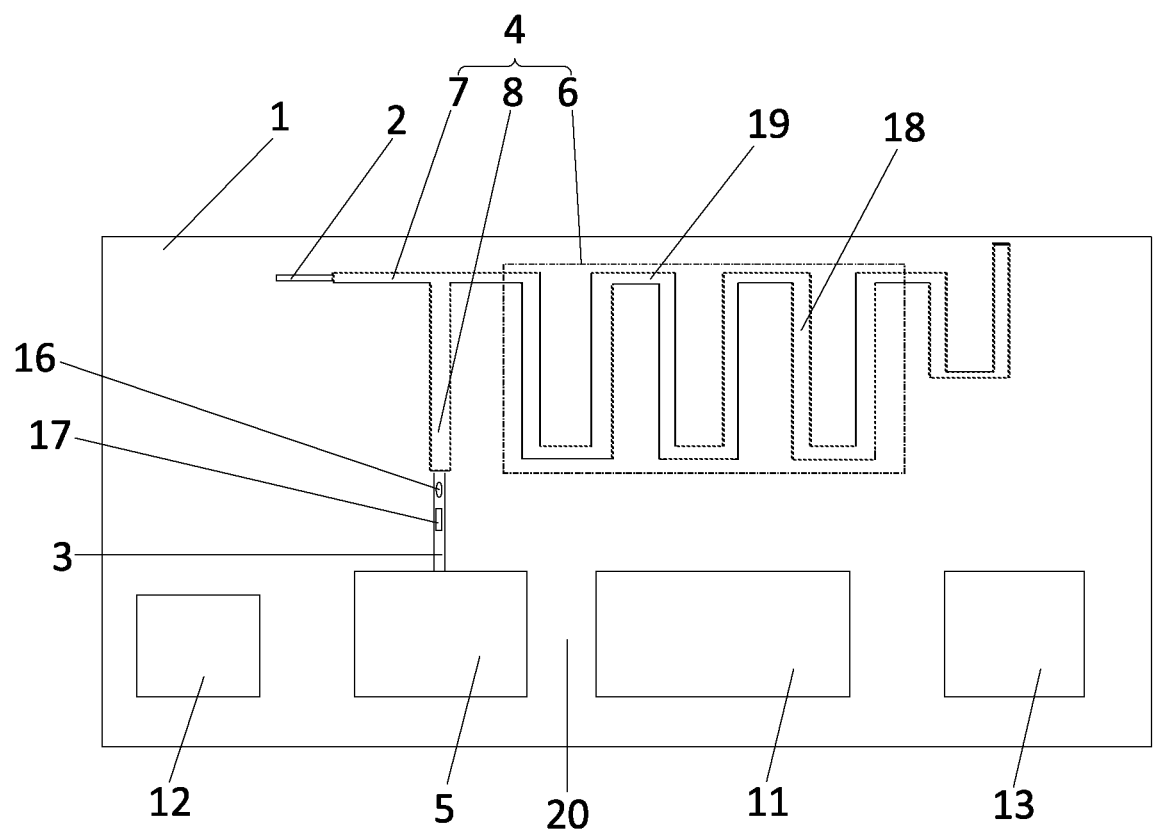
FIG. 1 is a schematic diagram showing a structure of an electronic pen mainboard provided in an embodiment of the disclosure.

FIG. 1 is a schematic diagram showing a structure of an electronic pen mainboard provided in an embodiment of the disclosure. As shown in FIG. 1, an embodiment of the disclosure provides an electronic pen mainboard, including a mainboard ground 1, a ground line 2, a radio frequency signal feeder line 3, an antenna 4 and a radio frequency chip 5. The antenna 4 includes: a radiating part 6 distributed in an S shape; a ground part 7 connected with the radiating part 6 and connected with the mainboard ground 1 through the ground line 2; and a transceiving part 8 connected with the radiating part 6 and connected with the radio frequency chip 5 through the radio frequency signal feeder line 3. On a plane where the mainboard ground 1 is located, the ground line 2 is perpendicular to the radio frequency signal feeder line 3.

According to the electronic pen mainboard provided in an embodiment of the disclosure, the transceiving part 8 of the antenna 4 is connected with the radio frequency chip 5 through the radio frequency signal feeder line 3 to form a radio frequency signal transceiving line path; and the ground part 7 of the antenna 4 is connected with the mainboard ground 1 through the ground line 2 to form a return path radiating an electromagnetic field. The radio frequency chip 5 is responsible for radio communication to realize remote wireless connection and control of each function; and the antenna 4 is responsible for transmitting and receiving a radio signal.

The S-shaped distribution way of the radiating part 6 is beneficial to the reasonable utilization of the area of the mainboard ground 1 and the reduction of the volume of the electronic pen mainboard, thereby making the overall product smaller and more portable. In addition, on the plane where the mainboard ground 1 is located, the ground line 2 is perpendicular to the radio frequency signal feeder line 3, so that interference between the ground line 2 and the radio frequency signal feeder line 3 is reduced, a parasitic effect of the antenna 4 is reduced, the antenna 4 has a large bandwidth, and furthermore, the work efficiency of the antenna 4 is increased. In some embodiments, a working frequency band of the antenna 4 is 2.4 GHz.

In some embodiments, the radiating part distributed in the S shape includes a plurality of tracing areas disposed side by side and transition areas 19 located between any two of the adjacent tracing areas, and an extension direction of the radiating part in each of the tracing areas is perpendicular to an extension direction of the radiating part in the transition areas 19 so that the radiating part is distributed in the S shape.

In some embodiments, the antenna has a line width ranging from 1 mm to 2 mm.

In some embodiments, the radiating part includes the plurality of tracing areas disposed side by side and the plurality of transition areas 19, each of the tracing areas is perpendicular to any one of the transition areas 19, so that the radiating part is distributed in the S shape.

In some embodiments, the tracing areas have line lengths ranging from 3 mm to 5 mm, and the transition areas 19 have line lengths ranging from 0.8 mm to 1.2 mm.

In some embodiments, when being allowed by a product space, the line width of the antenna 4 may be adjusted between 1 mm and 2 mm, and the line lengths of the tracing areas 18 of the radiating part 6 of the antenna 4 may be adjusted between 3 mm and 5 mm.

In this way, the antenna 4 with a different size may be flexibly selected within an appropriate range under the condition that the antenna 4 keeps working normally, which increases application scenarios.

Figure 2:
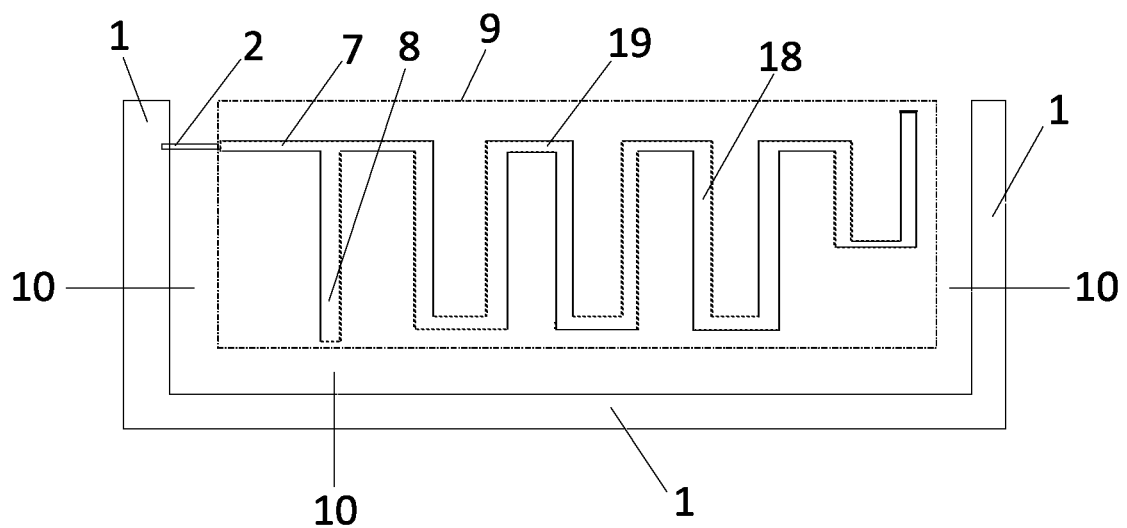
FIG. 2 is a schematic diagram showing a partial structure of an electronic pen mainboard provided in an embodiment of the disclosure.

FIG. 2 is a schematic diagram showing a partial structure of an electronic pen mainboard provided in an embodiment of the disclosure. As shown in FIG. 1 and FIG. 2, in some embodiments, a surface, used for tracing, of the electronic pen mainboard further includes a clearance region 9 and a tracing region 20; the antenna 4 is printed in the clearance region 9; and the radio frequency chip 5 and the mainboard ground 1 are printed in the tracing region 20.

In some embodiments, as shown in FIG. 2, a gap 10 is formed between an edge of the clearance region 9 and the mainboard ground 1.

Due to the arrangement of the gap 10, interference of other components on the mainboard ground 1 to the antenna 4 may be avoided, and therefore, the normal work of the antenna 4 is guaranteed.

Other metal traces other than the antenna 4 may not be laid in the clearance region 9, interference to the normal work of the antenna 4 is further avoided, and therefore, the work efficiency of the antenna 4 is prevented from being reduced.

In addition, when being allowed by the product space, the gap 10 formed between the edge of the clearance region 9 and the mainboard ground 1 may be adjusted within the range from 1 mm to 5 mm so that the optimal working state of the antenna 4 is achieved.

In some embodiments, as shown in FIG. 1, the electronic pen mainboard further includes a central processing unit 11 of a chip, a protective circuit 12 and a power management module 13.

In some embodiments, the central processing unit 11 of the chip controls the electronic pen mainboard to complete corresponding functions; and the power management module 13 is configured to supply a stabilized voltage, maintaining the stability of a circuit together with the protective circuit 12 and playing a role in protecting the circuit.

An embodiment of the disclosure further provides an electronic pen, including any one above-mentioned electronic pen mainboard.

Figure 3:
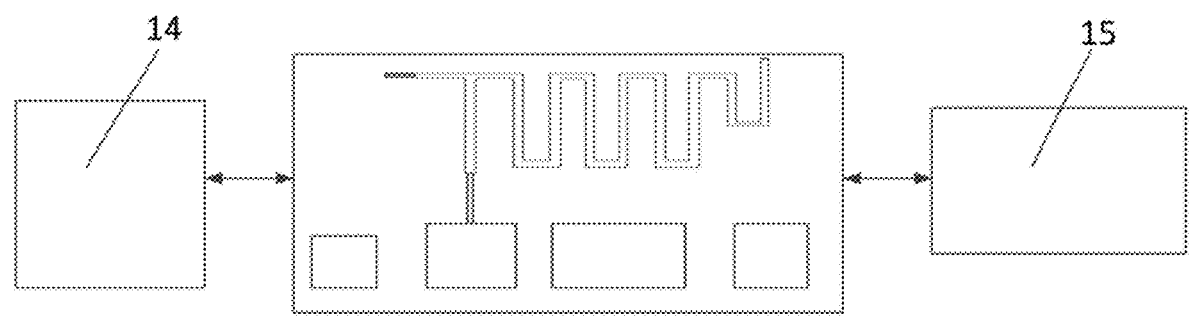
FIG. 3 is a schematic diagram showing a structure of an electronic pen provided in an embodiment of the disclosure.

In some embodiments, FIG. 3 is a schematic diagram showing a structure of an electronic pen provided in an embodiment of the disclosure. As shown in FIG. 3, the electronic pen further includes a functional sensor 14 and a battery 15; and the functional sensor 14 and the battery 15 are both electrically connected with the electronic pen mainboard.

In some embodiments, the functional sensor 14 completes a function similar to a mouse or a keyboard by detecting a position of a ray or target object so that the electronic pen is capable of achieving the effects such as commodity recognition and production tracking.

During layout, the antenna 4 should be flexibly adjusted in consideration of the use characteristics of a user, so that the phenomenon that the work efficiency of the antenna 4 is reduced due to influences of a human body or a decoration part on the performance of the antenna 4 is avoided. For example, when the electronic pen is used, fingers of the user should be away from the antenna 4, and metal decoration parts should be avoided during the layout of the antenna 4.

In some embodiments, as shown in FIG. 1, the radio frequency signal feeder line 3 of the antenna 4 is provided with a resistor 16 of 0-ohm and an external antenna interface 17.

In some embodiments, since the radio frequency signal feeder line 3 of the antenna 4 is provided with the resistor 16 of 0-ohm and the external antenna interface 17, when the resistor 16 is removed, the electronic pen may be used as an external electronic pen if only the external antenna 4 is connected to the external antenna interface 17; when the resistor 16 is mounted, the electronic pen is used as an on-board electronic pen; and one of the two external and on-board modes may be selected to be used according to a specific working condition.

The external antenna 4 is preferably in a Flexible Printed Circuit, (FPC) mode, and the external antenna interface 17 may select an IPEX interface.

Obviously, those skilled in the art can make various alterations and transformations on the disclosure without departing from the spirit and scope of the disclosure. In this way, if these alterations and transformations of the disclosure fall within the scope of the claims of the disclosure and equivalent technologies thereof, the disclosure is also intended to include these alterations and transformations.

What is claimed is:

1. An electronic pen mainboard, comprising a mainboard ground, a ground line, a radio frequency signal feeder line, an antenna and a radio frequency chip, wherein the antenna comprises:
   a radiating part distributed in an S shape;
   a ground part connected with the radiating part and connected with the mainboard ground through the ground line, wherein the ground part is a straight line; and
   a transceiving part connected with the radiating part and connected with the radio frequency chip through the radio frequency signal feeder line,
   wherein the ground line is perpendicular to the radio frequency signal feeder line on a plane where the mainboard ground is located;
   wherein the ground part is perpendicular to the transceiving part.

2. The electronic pen mainboard according to claim 1, wherein the antenna has a line width ranging from 1 mm to 2 mm.

3. The electronic pen mainboard according to claim 1, wherein the radiating part comprises a plurality of tracing areas disposed side by side and transition areas located between any two of adjacent tracing areas, and an extension direction of the radiating part in each of the tracing areas is perpendicular to an extension direction of the radiating part in the transition areas so that the radiating part is distributed in the S shape.

4. The electronic pen mainboard according to claim 3, wherein the radiating part in the tracing areas have a vertical line lengths ranging from 3 mm to 5 mm, and the radiating part in the transition areas have a horizontal line lengths ranging from 0.8 mm to 1.2 mm.

5. The electronic pen mainboard according to claim 1, wherein a surface configured to trace, of the electronic pen mainboard comprises a clearance region and a tracing region; the antenna is printed in the clearance region; and the radio frequency chip are arranged in the tracing region, and the mainboard ground are printed in the tracing region.

6. The electronic pen mainboard according to claim 5, wherein a gap is formed between an edge of the clearance region and the mainboard ground.

7. An electronic pen, comprising an electronic pen mainboard; the electronic pen mainboard comprises a mainboard ground, a ground line, a radio frequency signal feeder line, an antenna and a radio frequency chip, wherein the antenna comprises:

a radiating part distributed in an S shape;
a ground part connected with the radiating part and connected with the mainboard ground through the ground line, wherein the ground part is a straight line; and
a transceiving part connected with the radiating part and connected with the radio frequency chip through the radio frequency signal feeder line,
wherein the ground line is perpendicular to the radio frequency signal feeder line on a plane where the mainboard ground is located;

wherein the ground part is perpendicular to the transceiving part.

8. The electronic pen according to claim 7, wherein the antenna has a line width ranging from 1 mm to 2 mm.

9. The electronic pen according to claim 7, wherein the radiating part distributed comprises a plurality of tracing areas disposed side by side and transition areas located between any two of adjacent tracing areas, and an extension direction of the radiating part in each of the tracing areas is perpendicular to an extension direction of the radiating part in the transition areas so that the radiating part is distributed in the S shape.

10. The electronic pen according to claim 9, wherein the radiating part in the tracing areas have a vertical line lengths ranging from 3 mm to 5 mm, and the radiating part in the transition areas have a horizontal line lengths ranging from 0.8 mm to 1.2 mm.

11. The electronic pen according to claim 7, wherein a surface configured to trace, of the electronic pen mainboard comprises a clearance region and a tracing region; the antenna is printed in the clearance region; and the radio frequency chip are arranged in the tracing region, and the mainboard ground are printed in the tracing region.

12. The electronic pen according to claim 11, wherein a gap is formed between an edge of the clearance region and the mainboard ground.

13. The electronic pen according to claim 7, wherein the electronic pen further comprises a functional sensor and a battery;

and the functional sensor and the battery are both electrically connected with the electronic pen mainboard.

14. The electronic pen according to claim 13, wherein the radio frequency signal feeder line of the antenna is provided with a resistor of 0-ohm and an external antenna interface.

* * * * *